(12) United States Patent
Moak

(10) Patent No.: US 12,468,042 B2
(45) Date of Patent: Nov. 11, 2025

(54) SYSTEMS AND METHODS TO DETECT TRAILER ANGLE

(71) Applicant: EMBARK TRUCKS, INC., San Francisco, CA (US)

(72) Inventor: Brandon Moak, San Francisco, CA (US)

(73) Assignee: EMBARK TRUCKS, INC., San Francisco, CA (US)

( * ) Notice: Subject to any disclaimer, the term of this patent is extended or adjusted under 35 U.S.C. 154(b) by 948 days.

(21) Appl. No.: 17/547,531

(22) Filed: Dec. 10, 2021

(65) Prior Publication Data
US 2023/0184953 A1 Jun. 15, 2023

(51) Int. Cl.
| | | |
|---|---|---|
| *G01S 17/931* | (2020.01) | |
| *B60W 40/10* | (2012.01) | |
| *G01S 7/48* | (2006.01) | |
| *G01S 7/51* | (2006.01) | |
| *G01S 17/86* | (2020.01) | |
| *G01S 17/89* | (2020.01) | |
| *B62D 13/00* | (2006.01) | |

(52) U.S. Cl.
CPC ........... *G01S 17/931* (2020.01); *B60W 40/10* (2013.01); *G01S 7/4808* (2013.01); *G01S 7/51* (2013.01); *G01S 17/86* (2020.01); *G01S 17/89* (2013.01); *B60W 2300/14* (2013.01); *B62D 13/00* (2013.01)

(58) Field of Classification Search
CPC ........ G01S 17/931; G01S 7/4808; G01S 7/51; G01S 17/86; G01S 17/89; G01S 17/42; B60W 40/10; B60W 2300/14; B62D 13/00; B62D 13/06
USPC .......................................................... 701/41
See application file for complete search history.

(56) References Cited

U.S. PATENT DOCUMENTS

| | | | | |
|---|---|---|---|---|
| 2014/0200759 A1* | 7/2014 | Lu | ............................. | G06T 7/73 |
| | | | | 701/28 |
| 2015/0217693 A1* | 8/2015 | Pliefke | ................... | H04N 7/183 |
| | | | | 348/118 |
| 2019/0347498 A1* | 11/2019 | Herman | ................. | G08G 1/162 |

* cited by examiner

*Primary Examiner* — Yi-Kai Wang
(74) *Attorney, Agent, or Firm* — McDermott Will & Schulte LLP

(57) ABSTRACT

Provided are systems and methods for determining an angle of articulation between a vehicle and a trailer.

20 Claims, 9 Drawing Sheets

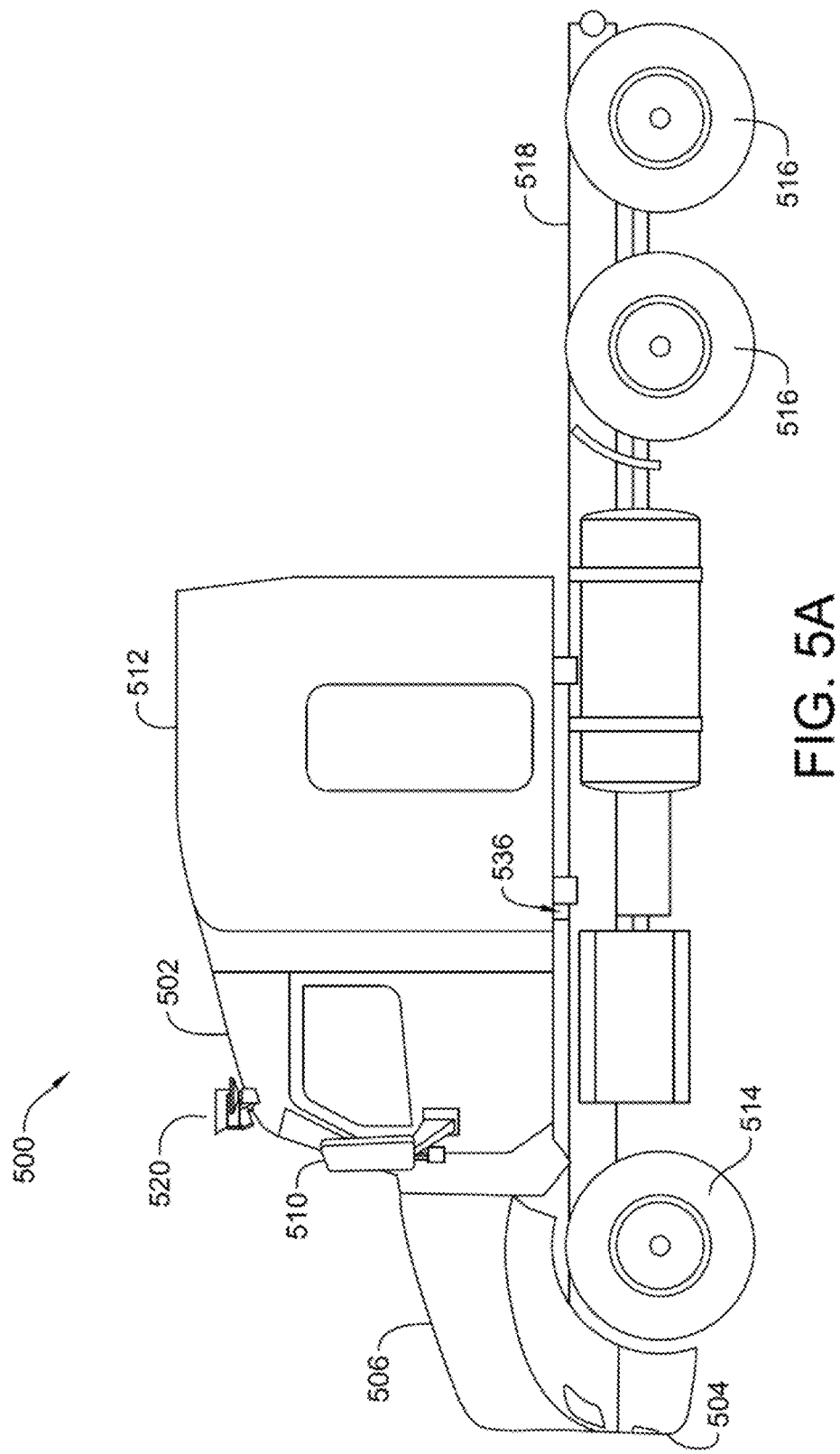

SYSTEMS AND METHODS TO DETECT TRAILER ANGLE

BACKGROUND

Vehicles towing trailers can be difficult to maneuver. It can be particularly difficult to maneuver large trailers such as those towed by semi-trucks. These trailers may create large blind spots during turns (when moving forward or reverse) which impede the operator's ability to safely maneuver the vehicle, may move independently from the semi-truck cab and impact overall vehicle dynamics significantly. These difficulties are also present when such vehicles are operated in an autonomous or semi-autonomous manner. Previous systems have attempted to equip trailers with external sensors or cameras to reduce the blind spots. However, because semi-truck trailers are often used to store goods when not in transit, it is not desirable to equip such trailers with expensive or sensitive sensors or cameras. In addition, such cameras add cost, complexity and additional failure points to an autonomous system.

Accordingly, what is needed are improved systems and methods to detect trailer articulation angles. It would further be desirable to provide such systems or methods without placing sensors or cameras on the trailer.

SUMMARY

The example embodiments overcome the drawbacks of the use of sensors or cameras mounted on a trailer. For example, pursuant to some embodiments, a sensor (such as, for example, a lidar sensor or sensors) may be mounted on a back of a vehicle (e.g., such as on a rear surface of a cab of a semi-truck) and directed toward a front face of a trailer to capture sensor data. The sensor data is analyzed to identify a current plane occupied by a front face of the trailer, and the current plane is compared to a reference plane when the front face of the trailer is in a reference orientation to identify an angle of articulation between the trailer and the vehicle. The angle of articulation is provided to a control system of the vehicle.

In some embodiments, a position of the rear of the trailer may be determined using the angle of articulation as well as information identifying one or more dimensions of the trailer. In some embodiments, a projected trajectory of the trailer may be determined using the angle of articulation and information identifying a trajectory of the vehicle. Pursuant to some embodiments, the angle of articulation may be used to generate one or more control signals to control the operation of the vehicle, to cause information to be displayed on a display device or to cause the generation of an alarm or alert.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 5A-5C are diagrams illustrating exterior views of a semi-truck that may be used in accordance with example embodiments.

Figure 1:
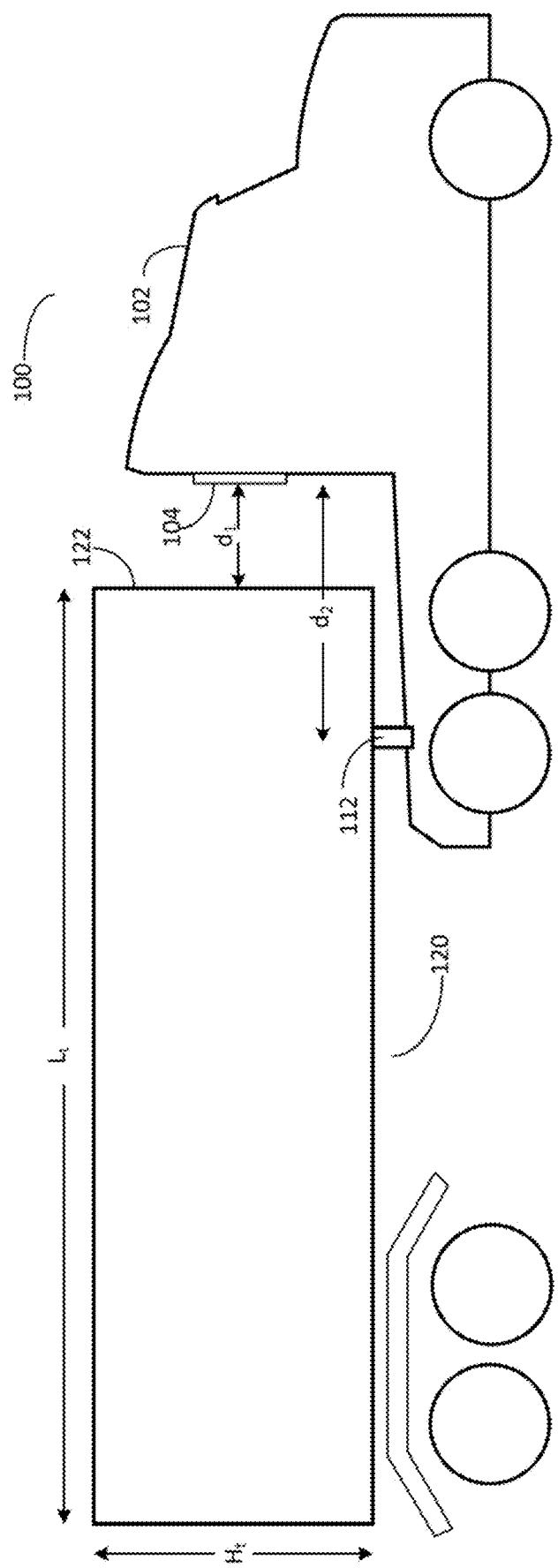
FIG. 1 is a diagram illustrating an example of a semi-truck and trailer pursuant to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer.

Features of some embodiments will now be described by first referring to FIG. 1 which depicts a semi-truck 100 in which features of the present invention are deployed. Semi-truck 100 may include a truck 102 pulling a detachable trailer 120. The trailer 120 is connected to the truck 102 at a kingpin 112 which allows the trailer 120 to articulate or turn in relation to the truck 102. Pursuant to some embodiments, one or more rear-facing light detection and ranging (LiDAR) sensors 104 are mounted on a surface facing a front surface 122 of the trailer 120. For example, a lidar sensor 104 may be mounted on a rear surface of a cab or sleeper compartment of the truck 102. The lidar sensor 104 may also be mounted on a special purpose rack or other mount. Preferably, the lidar sensor 104 is mounted in a fixed location such that data from the lidar sensor 104 is consistent even during operation of the semi-truck 100.

Figure 2A:
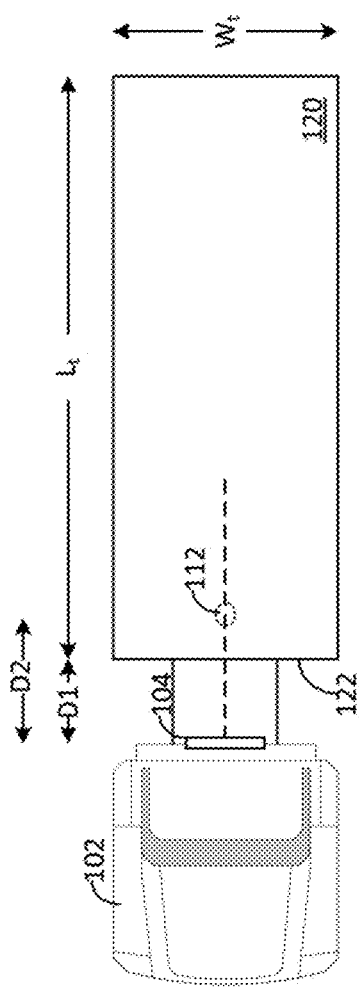
FIGS. 2A-2D are diagrams illustrating a top view of the semi-truck and trailer of FIG. 1 in various configurations.

In general, the lidar sensor 104 may be a two-dimensional lidar sensor or any lidar sensor capable of detecting an orientation of the front surface 122 of a trailer 120 as described herein. A typical lidar sensor emits pulsed light waves into the surrounding environment. These pulses bounce off surrounding objects and return to the sensor. The sensor uses the time it took for each pulse to return to the sensor to calculate the distance it traveled. The lidar sensor 104 is sized and positioned to enable it to capture sufficient surface area of the front surface of the trailer 120 to accurately determine an orientation of the trailer 120 with respect to the orientation of the lidar sensor 104 (which is positioned substantially parallel to the front surface 122 of the trailer 120 when the trailer 120 is oriented directly behind the semi-truck 100 as shown in FIG. 2A).

Figure 2B:
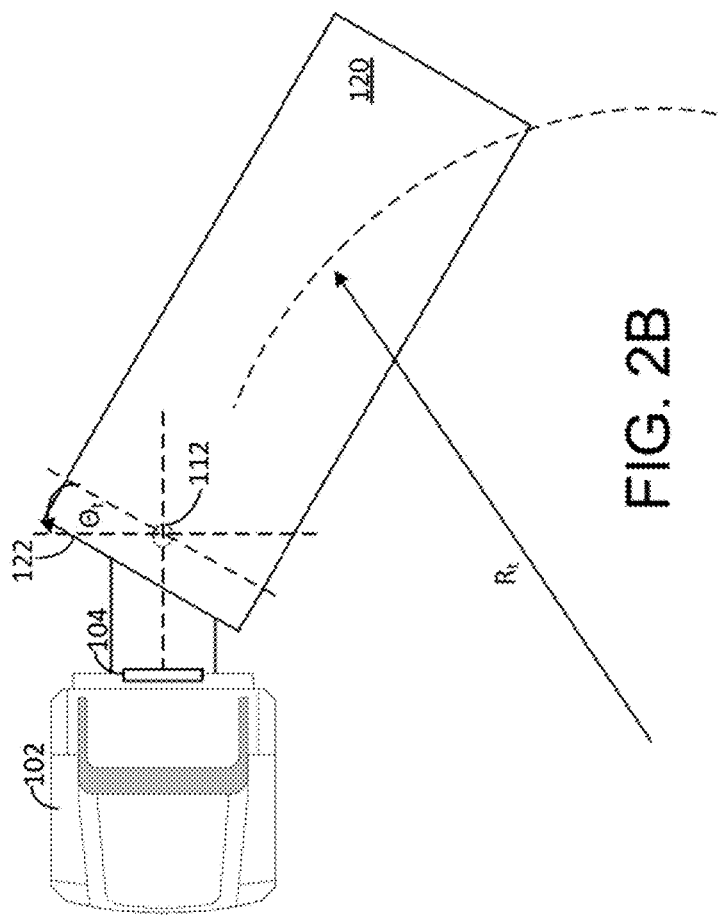

As shown in FIG. 1, the cargo space of the trailer 120 has a length $L_t$ and a height $H_t$. The trailer also has a width $W_t$ (as shown in FIG. 2A). Further, the trailer 120 has a front surface 122 that is separated from the lidar sensor 104 by a distance D1. The lidar sensor 104 is separated from the kingpin 112 by a distance D2. In general, the trailer 120 may be of a standardized size and configuration (e.g., in North America, the length $L_t$ may be approximately 55 feet and the width $W_t$ may be approximately 11 feet). As will be discussed further herein, other dimensions of interest may include the wheelbase of the truck 102 as well as the wheelbase of the trailer 120. Referring now to FIG. 2A, when the trailer 120 is positioned directly behind the truck 102 (e.g., when the semi-truck is moving forward in a straight line), the front surface 122 of the trailer 120 is substantially parallel to the face of the lidar sensors 104 (and substantially perpendicular to the direction of photons emitted from the lidar sensor 104). As the truck 102 turns (as shown in FIG. 2B), the front surface 122 of the trailer 120 articulates in relation to the truck 102 and an angle of articulation (which may be referred to herein as "theta" or $\theta_t$) increases. Pursuant to some embodiments, when the angle of articulation ($\theta_t$) is determined for a trailer 120 having a known configuration (e.g., a known wheelbase, and a known length, width and height), a graphical model of the pose or position of the truck 102 and the trailer 120 may be computed. Further, as changes in the angle of articulation are identified (e.g., as the truck 102 and trailer 120 turn) a trajectory plan may be computed to estimate a trajectory of the truck 102 and the trailer 120. A number of trajectory attributes may be determined based on the identification of the angle of articulation, including, for example, a turn radius $R_t$ of the trailer 120. As will be discussed further below, these attributes may be determined using a control system deployed in the truck 102 such as the control system 400 of FIG. 4.

In some embodiments, a control system may receive inputs from other sensors associated with the truck 102, the trailer 120 or an environment in which the truck 102 and trailer 120 are operating. In some embodiments, control signals may be output from the control system to modify or affect operation of the truck 102 or trailer 120. For example, a sensor that detects a presence and orientation of an object (e.g., such as a curb) may result in the control system producing a modified control signal (that takes into account the orientation of the trailer 120 as well as the location and orientation of the object) to modify operation of the truck 102 and trailer 120 (e.g., to avoid the object).

This information about the pose or position as well as the trajectory of the truck 102 and trailer 120 may be particularly useful to an operator (in a non- or semi-autonomous mode of operation). For example, if the operator is backing the truck 102 and trailer 120 in reverse (e.g., to align with a loading dock or the like), large blind spots can be created when the angle of articulation increases, and it can be difficult for an operator to accurately determine a trajectory of the trailer 120. Embodiments allow the determination of the angle of articulation as well as the computation of the pose, position or trajectory of the truck 102 and trailer 120. This information may be displayed to the operator on a user interface (such as a display device mounted in the cab of the vehicle). Further, in autonomous or semi-autonomous systems or modes of operation, this information may be used to control or otherwise influence the operation of the truck 102 (e.g., by controlling the throttle, steering, brakes, or other components of the truck 102).

Pursuant to some embodiments, alarms or alerts may be generated when the angle of articulation exceeds a threshold (e.g., where the truck 102 and trailer 120 are in danger of jackknifing—a situation where the trailer pushes the truck forward causing it to rotate). In some embodiments, information associated with the angle of articulation may be analyzed in conjunction with other information about a state of the vehicle. For example, the angle of articulation may be analyzed in conjunction with speed information. As an illustrative example, a large angle of articulation may not be an issue if the vehicle is traveling at a low speed, but it will be an issue if the vehicle is traveling at a higher speed. Alarms or alerts may also be triggered in situations where the rear of the trailer 120 may swing or extend out of a lane during a turn. For example, when a semi-truck turns through an intersection, the rear of the trailer 120 will swing outward. If the turn is not made properly, the swing of the trailer 120 can extend into another lane of traffic or hit an obstruction. Embodiments allow the determination of the pose and trajectory of all portions of the trailer 120.

Figure 3:
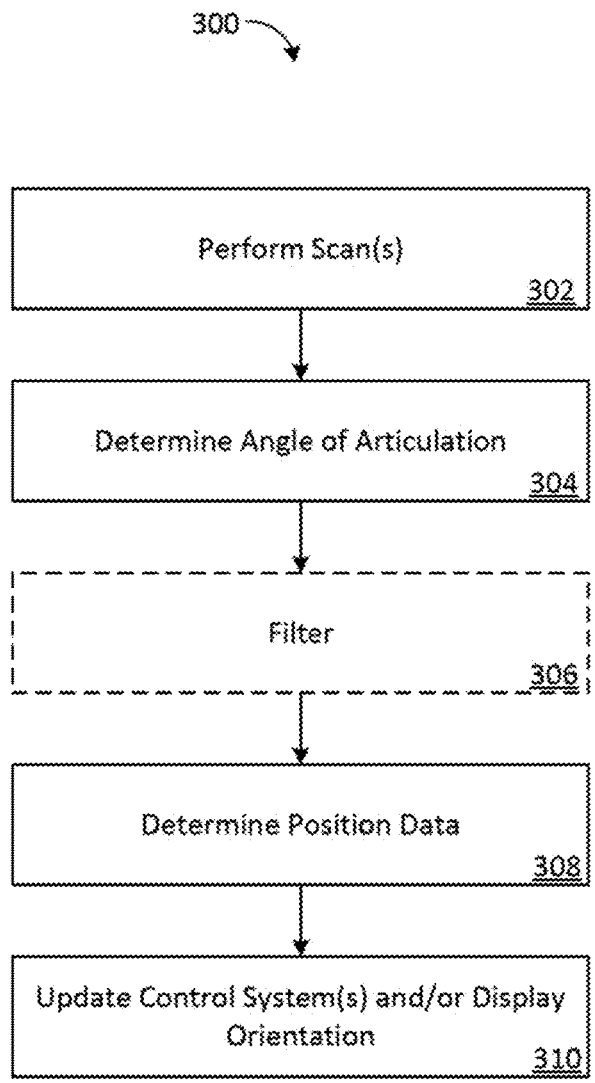
FIG. 3 is a flow diagram illustrating a process in accordance with an example embodiment.

FIG. 3 illustrates a process 300 for determining a position or trajectory of a trailer 120 pursuant to some embodiments. The process 300 may be performed, for example, using a control system deployed on a truck 102 or other vehicle, such as the control system 400 of FIG. 4. In some embodiments, some or all of the steps of process 300 may be performed using one or more remote systems (such as, for example, a network-connected server, a cloud platform, or the like). The flow charts described herein do not imply a fixed order to the steps, and embodiments of the present invention may be practiced in any order that is practicable. Note that any of the methods or processes described herein may be performed by hardware, software, or any combination thereof. For example, a computer-readable storage medium may store thereon instructions that, when executed by a machine or processor, result in performance according to any of the embodiments described herein.

In some embodiments, the process 300 may be continually running during operation of the truck 102 and trailer 120. That is, while the vehicle is in operation, embodiments may continually be monitoring the articulation angle and using the articulation angle to update control systems associated with the vehicle. Process 300 may begin at 302 where the lidar sensors 104 are operated to perform one or more scans. Because the lidar sensors 104 are rear-facing (and pointed toward a front surface 122 of the trailer 120), the scan results may be used to identify a relative position of the front surface 122 of the trailer 120 (e.g., the distance between the lidar sensor 104 and different edges of the front surface 122 of the trailer 120 may be determined).

Figure 2C:
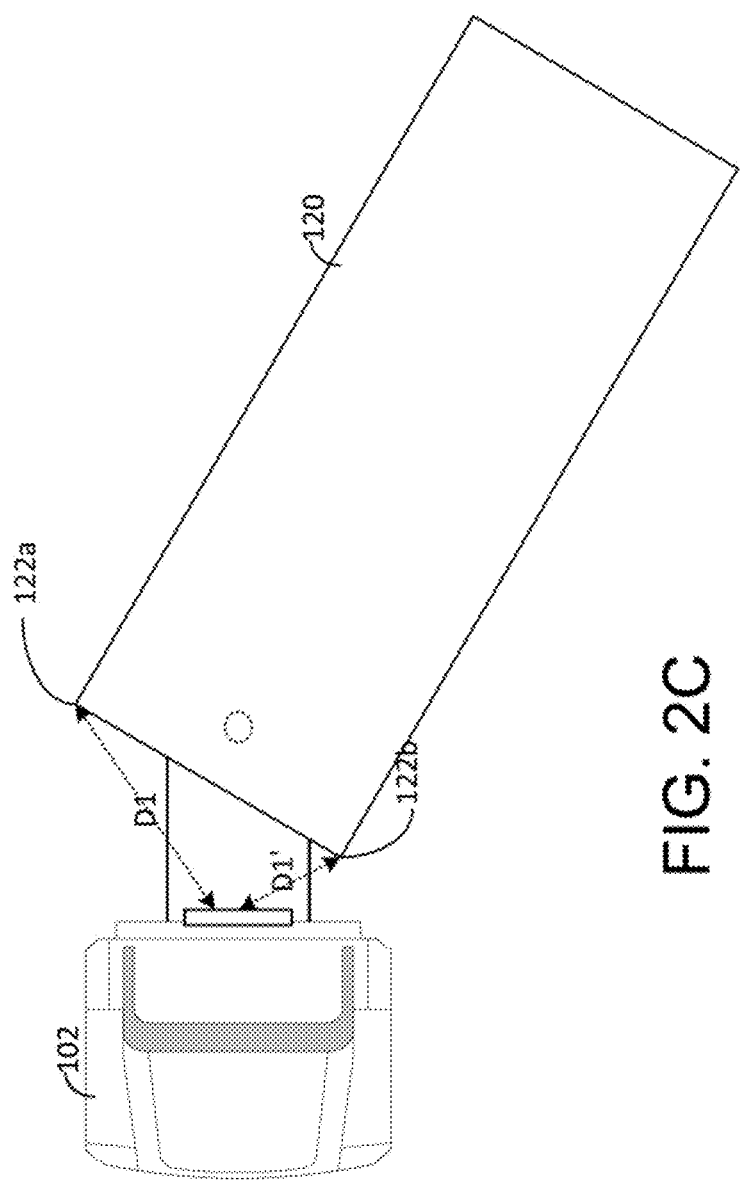

For example, referring to FIG. 2C, the lidar sensor 104 may be configured to determine a distance (D1) to one edge 122a of the front surface 122 of the trailer 120 as well as a distance (D2) to another edge 122b of the front surface 122 of the trailer 120. Distances to the top and bottom edges of the front surface 122 of the trailer 120 may also be determined (e.g., which may be used by a control system to determine a forward/aft orientation of the trailer 120 with respect to the truck 120). In general, the distance to each edge or point on the front surface 122 may be determined by converting the pulse width of the lidar pulses into a distance (e.g., a pulse width of 10 µSec is approximately equal to 10 centimeters of distance). Further, the distances D1 and D2 need not be to the edge of the front surface 122, they may simply be distances allowing the determination of the current planar orientation of the front surface 122. Once the current plane is identified, it can be compared to a reference plane (the plane associated with the position of the trailer 120 where the front surface 122 is substantially parallel to the rear of the truck 102) to determine the angle of articulation.

Figure 4:
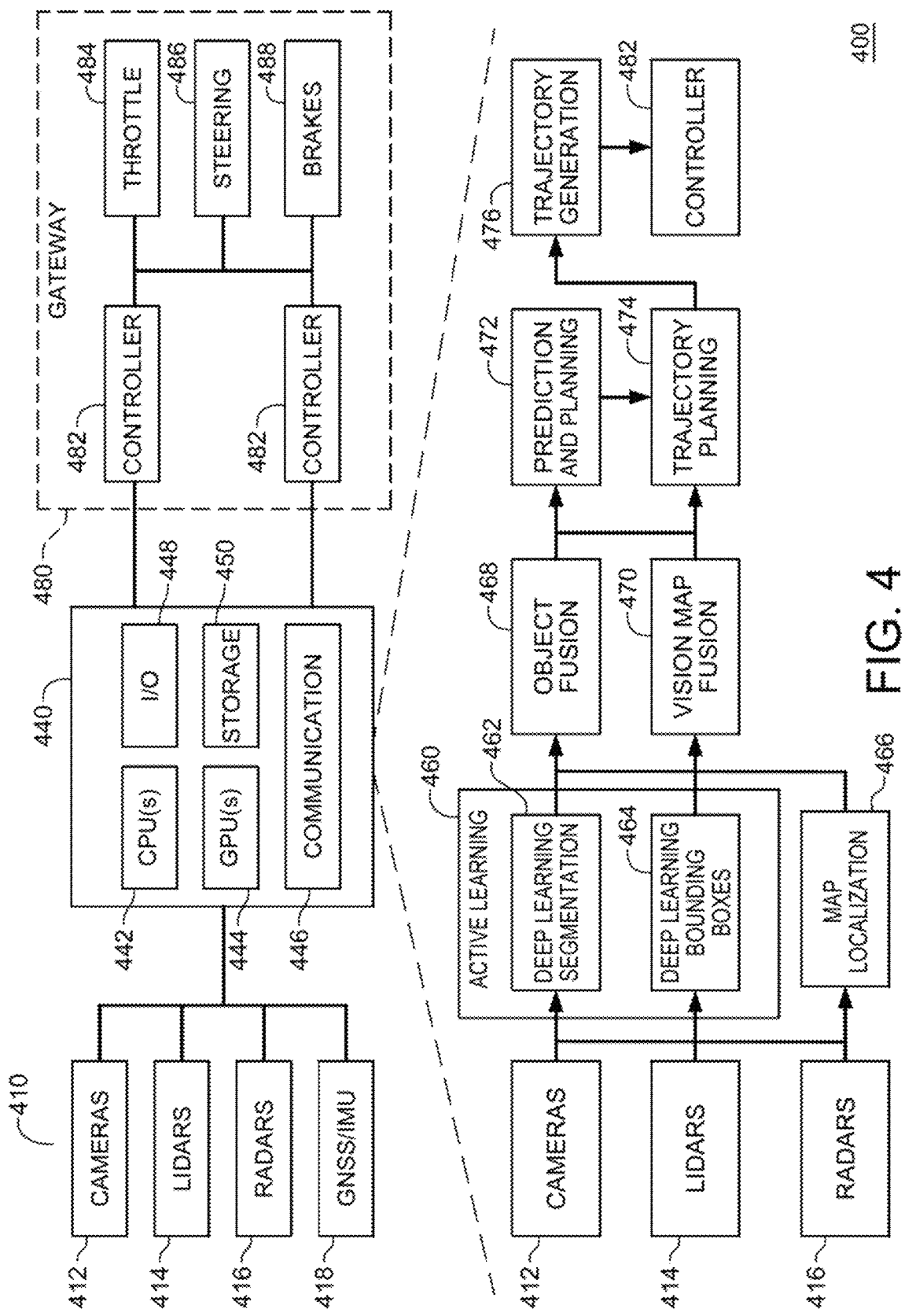
FIG. 4 is a diagram illustrating a control system that may be deployed in a vehicle such as the semi-truck depicted in FIGS. 5A-5C, in accordance with an example embodiment.

The scan results captured by the lidar sensors 104 may be provided to a control system such as the control system 400 of FIG. 4 for further analysis. Processing continues at 304 where the angle of articulation is determined. In some embodiments, the distance measurement(s) captured by the lidar sensors 104 are compared to distance measurements when the front surface 122 of the trailer 120 is perpendicular to the lidar beam paths (e.g., the orientation shown in FIG. 2A) to determine the angle of articulation of the trailer 120 with respect to the truck 102. The angle of articulation determined at 304 may be stored, e.g., in a memory device of the truck 102 (e.g., such as in a memory associated with the control system 400) along with a time stamp associated with the time of the measurement (e.g., the timestamp associated with the operation of the lidar sensors 104 at 302).

Pursuant to some embodiments, processing may continue at 306 where an optional filtering step may be performed to reduce any noise from the data received from the lidar sensors 104 at 302 as well as the data determined or calculated at 304. In some embodiments, a number of scans may be performed at 302 (e.g., over the course of a few seconds or some other short time period) and a filtering process at 306 may be performed to smooth the data. A number of different filtering approaches may be used. For example, a windowed averages approach or a Kalman filter approach may be used. Additionally, the filtering approach can be model based, such that it incorporates the kinematics or dynamics of the overall system to improve the accuracy and quality of the resulting signal.

Processing continues at 308 where the articulation angle determined at 304 (and possibly filtered at 306) may be used to determine position data associated with the trailer. For example, given the articulation angle, a system such as the control system 400 may be operated to calculate position data of different parts of the trailer 120. In some embodiments, information about the size and configuration of the trailer 120 may be stored by or accessible to the control system 400, allowing the control system 400 to calculate a current turn radius of the trailer 120, a position of the trailer 120 with respect to a lane or another reference, or the like. Further, the pose or position data associated with the trailer 120 may be augmented with other data available to the control system 400 including, for example, speed, acceleration, a current turning radius of the truck 102, orientation or environmental information (such as lane or object detection from cameras, other lidar sensors, or the like).

Figure 2D:
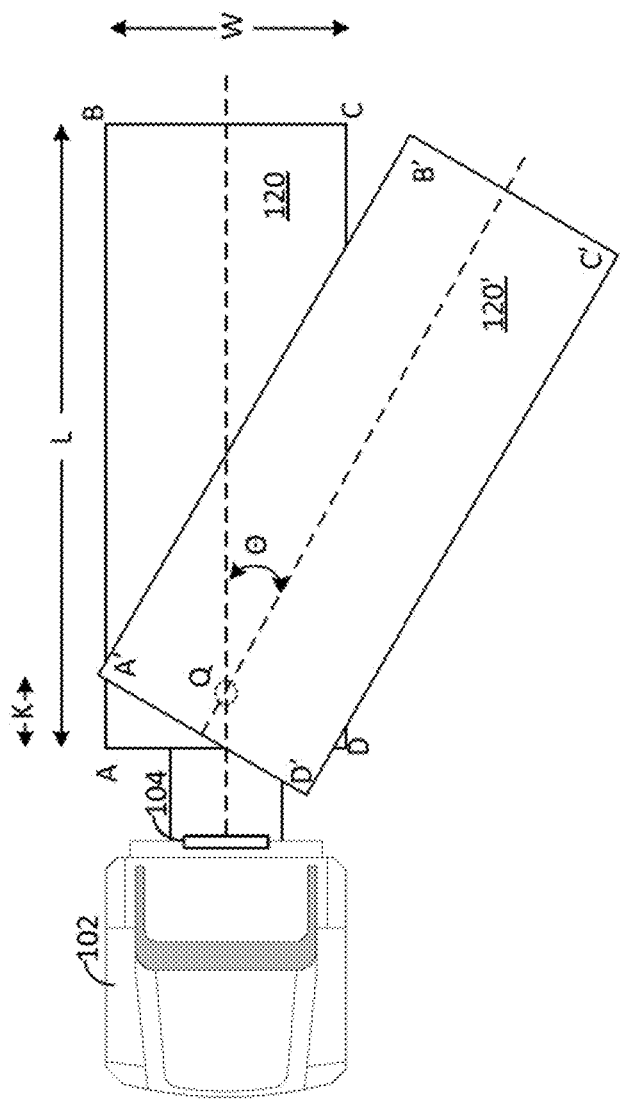

A representative example of an approach to processing can be seen in FIG. 2D in which a trailer 120 is shown in two positions (a first position shown as 120 where the front of the trailer is parallel to the rear of the truck 102 and a second position shown as 120' where the trailer is articulated). Points of interest around a center point of the trailer Q, e.g. the positions of the corners of the trailer A-D at any particular point in time may be represented in terms of Qx, Qy as well as the length (L) and width (W) of the trailer 120 and position (K) reflecting the distance from the trailer rotation point (e.g. the kingpin 112) at any point in time and the center point of the reference plane. The change in positions of the points of interest A-D may be calculated as a function of rotation θ as illustrated in a function R( ) as shown in the following:

$$A = \begin{bmatrix} Qx - K \\ Qy + W/2 \end{bmatrix}, B = \begin{bmatrix} Qx + L - K \\ Qy + W/2 \end{bmatrix}, C = \begin{bmatrix} Qx + L - K \\ Qy - W/2 \end{bmatrix}, D = \begin{bmatrix} Qx - K \\ Qy - W/2 \end{bmatrix}$$

$$\text{And, } R = \begin{bmatrix} \cos\Theta & -\sin\Theta \\ \sin\Theta & \cos\Theta \end{bmatrix}$$

Where $A' = R^*A$, $B' = R^*B$, $C' = R^*C$ and $D' = R^*D$.

A person of ordinary skill in the art, upon reading the present disclosure, will recognize that a variety of different reference points and calculation approaches may be taken, all of which fall within the full breadth of the invention.

Processing continues at 310 where a system (such as the control system 400 of FIG. 4) is updated with the position data determined at 308 and/or where the orientation and position of the trailer 120 are displayed to an operator. For example, processing at 310 may include updating a trajectory planning system (such as the system 474 of FIG. 4) or updating one or more fusion maps (such as items 468 or 470 of FIG. 4). Further, in some embodiments, processing at 310 may include causing the generation of control signals to control operation of the truck 102 (e.g., such as controlling the operation of a throttle, steering, brakes or other components). In some embodiments, processing at 310 may include generating a user interface for display to an operator (e.g., such as a driver of the truck 102) illustrating the current position or trajectory of the truck 102 and the trailer 120.

Figure 5B:
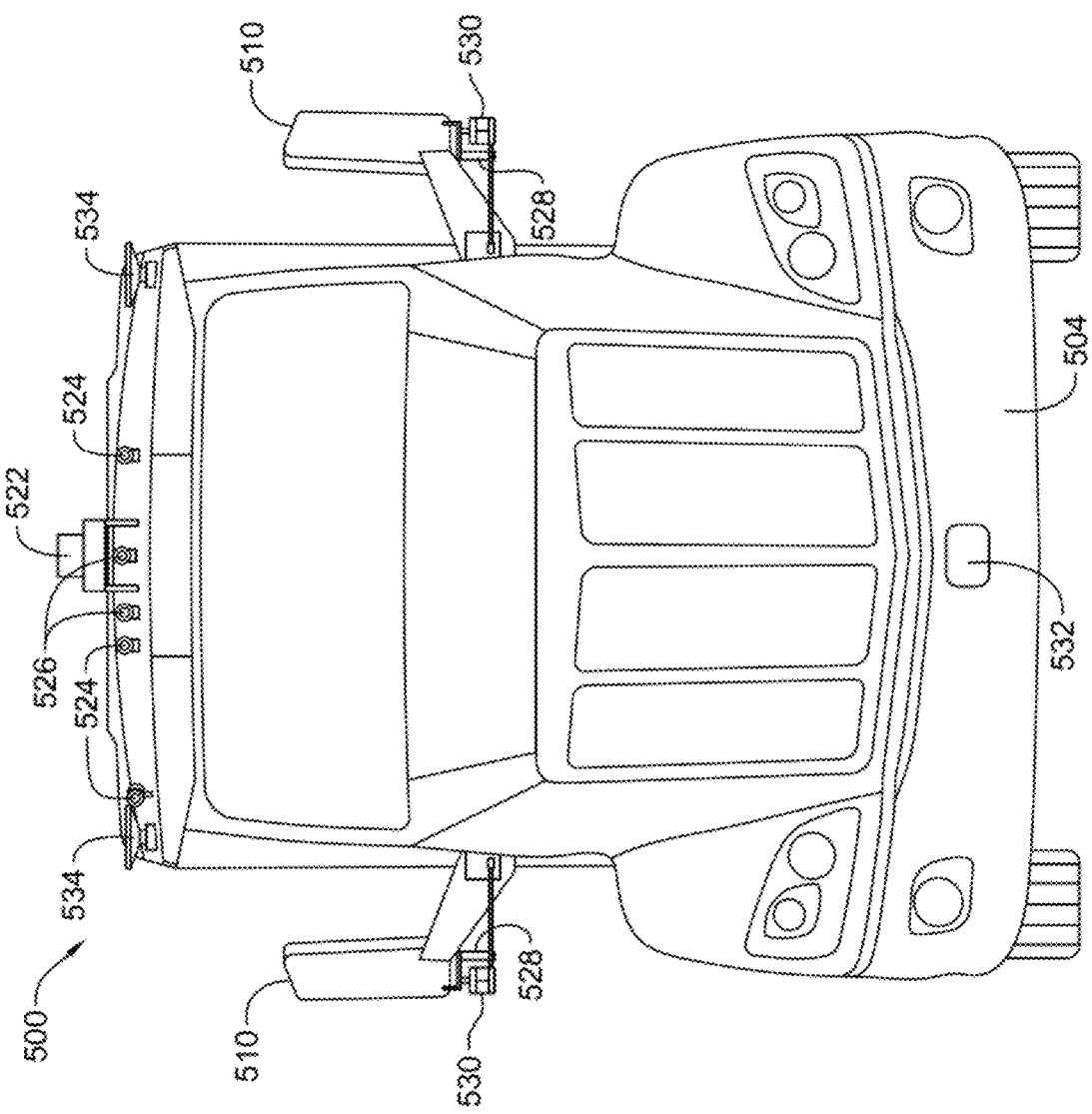
Figure 5C:
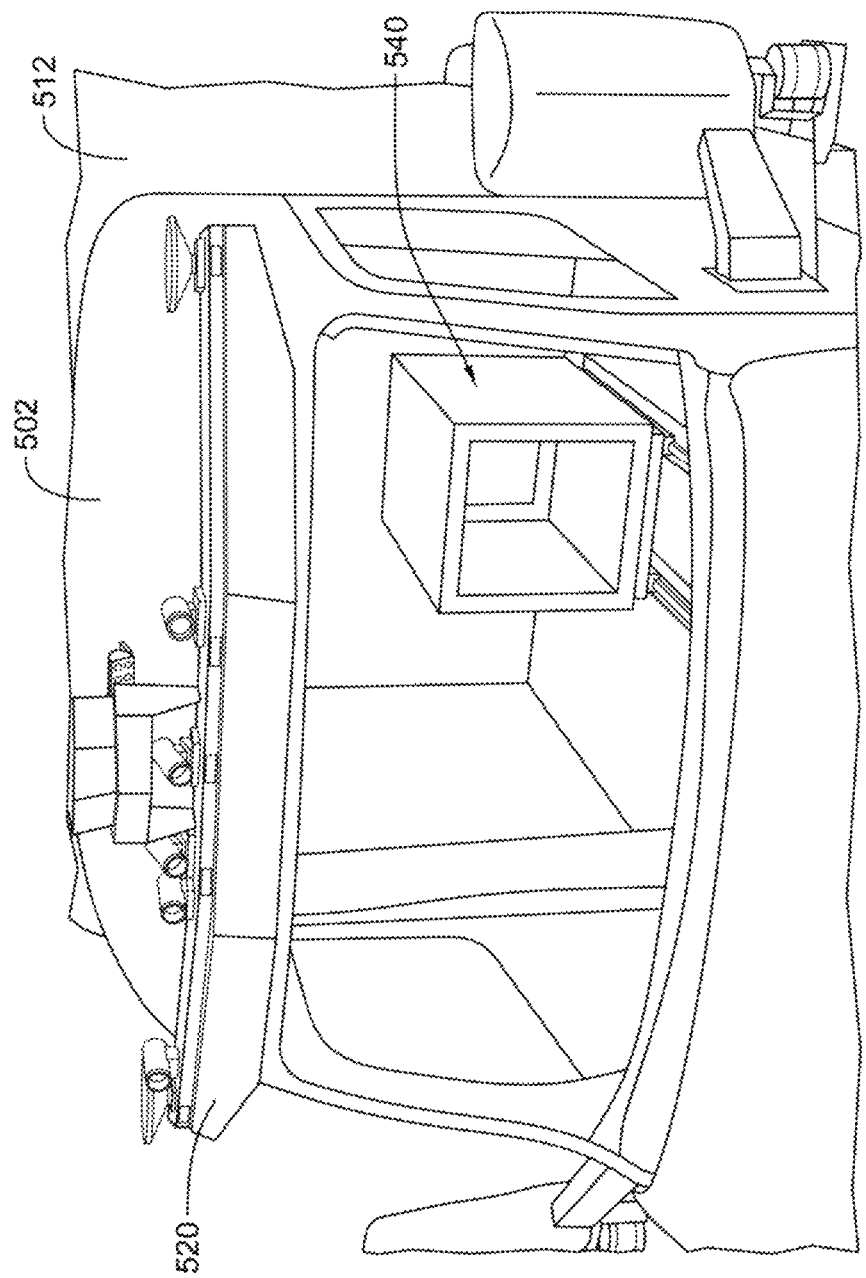

FIG. 4 illustrates a control system 400 that may be deployed in a vehicle such as the semi-truck 500 depicted in FIGS. 5A-5C, in accordance with an example embodiment. Referring to FIG. 4, the control system 400 may include a number of sensors 410 which collect data and information provided to a central computer system 440 to perform operations including, for example, control operations which control components of the vehicle via a gateway 480. Pursuant to some embodiments, the gateway 480 is configured to allow the central computer system 440 to control a number of different components from different manufacturers.

The central computer system 440 may be configured with one or more central processing units (CPUs) 442 to perform processing to implement features of embodiments of the present invention as described elsewhere herein as well as to receive sensor data from sensors 410 for use in generating control signals to control one or more actuators or other controllers associated with systems of the vehicle (including, for example, actuators or controllers allowing control of a throttle 484, steering systems 486, brakes 488 or the like). In general, the control system 400 may be configured to operate the semi-truck 500 in an autonomous (or semi-autonomous) mode of operation.

For example, the control system 400 may be operated to capture images from one or more cameras 412 mounted on various locations of the semi-truck 500 and perform processing (such as image processing) on those images to identify objects proximate or in a path of the semi-truck 500. Further, one or more lidar 414 and radar 416 sensors may be positioned to sense or detect the presence and volume of objects proximate or in the path of the semi-truck 500.

Pursuant to some embodiments, one or more of the lidars 414 may be a rearward-facing lidar (such as, for example, the lidar 104 of FIG. 1, or the lidar 540 of FIG. 5A) which is used to monitor an orientation of a trailer as described herein.

Other sensors may also be positioned or mounted on various locations of the semi-truck 500 to capture other information such as position data. For example, the sensors may include one or more satellite positioning sensors and/or inertial navigation systems such as GNSS/IMU 418. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 418 sensors may be used in conjunction with features of the present invention. The data collected by each of these sensors may be processed by the computer system 440 to generate control signals that control the operation of the semi-truck 500. The images and location information may be processed to identify or detect objects around or in the path of the semi-truck 500 and control signals may be emitted to adjust the throttle 484, steering 486 or brakes 488 as needed to safely operate the semi-truck 500. For example, as described herein, the computer system 440 may operate to monitor an orientation of a trailer using a lidar sensor such as the lidar 104 of FIG. 1 or the lidar 540 of FIG. 5A. The computer system 440 may include computer code which operates to perform a process such as the process 300 of FIG. 3 to update control systems (e.g., such as the throttle 484, steering 486, or brakes 488) based on the trailer orientation. The computer system 440 may also cause information associated with the trailer orientation to be displayed to an operator (e.g., via I/O devices 448). While illustrative example sensors and actuators or vehicle systems are shown in FIG. 5, those skilled in the art, upon reading the present disclosure, will appreciate that other sensors, actuators or systems may also be used. For example, in some embodiments, actuators to allow control of the transmission of the semi-truck 500 may also be provided.

The control system 400 may include a computer system 440 (such as a computer server) which is configured to provide a computing environment in which one or more software or control applications (such as items 460-482) may be executed to perform the processing described herein. In some embodiments, the computer system 440 includes components which are deployed on a semi-truck 500 (e.g., they may be deployed in a systems rack 540 positioned within a sleeper compartment 512 as shown in FIG. 5C). The computer system 440 may be in communication with other computer systems (not shown) that may be remote from the semi-truck 500 (e.g., the computer systems may be in communication via a network connection).

According to various embodiments described herein, the computer system 440 may be implemented as a server. In some embodiments, the computer system 440 may configured using any of a number of well-known computing systems, environments, and/or configurations such as, but not limited to, personal computer systems, cloud platforms, server computer systems, thin clients, thick clients, handheld or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 440 and the control system 400. For example, as shown, applications may be provided which perform active learning machine processing (active learning component 460) to process images captured by one or more cameras 412 and information obtained by lidars 414. For example, image data may be processed using deep learning segmentation models 462 to identify objects of interest in those images (such as, for example, other vehicles, construction signs, etc.). Here, deep learning segmentation may be used to identity lane points within the lidar scan. As an example, the system may use an intensity based voxel filter to identify lane points within the lidar scan.

lidar data may be processed by the machine learning applications 464 to draw or identify bounding boxes on image data to identify objects of interest located by the lidar sensors. Information output from the machine learning applications may be provided as inputs to object fusion 468 and vision map fusion 470 software components which may perform processing to predict the actions of other road users and to fuse local vehicle poses with global map geometry in real-time, enabling on-the-fly map corrections. The outputs from the machine learning applications may be supplemented with information from radars 416 and map localization 466 application data (as well as with positioning data). These applications allow the control system 400 to be less map reliant and more capable of handling a constantly changing road environment. Further, by correcting any map errors on the fly, the control system 400 can facilitate safer, more scalable and more efficient operations as compared to alternative map-centric approaches. Information is provided to prediction and planning application 472 which provides input to trajectory planning 474 components allowing a trajectory 476 to be generated in real time based on interactions and predicted interactions between the semi-truck 500 and other relevant vehicles in the environment. In some embodiments, for example, the control system 400 generates a sixty second planning horizon, analyzing relevant actors and available trajectories. The plan that best fits multiple criteria (including safety, comfort and route preferences) is selected and any relevant control inputs needed to implement the plan are provided to controllers 482 to control the movement of the semi-truck 500. This planning horizon may include trajectory information determined based on the calculation of an articulation angle as described herein.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 4 illustrates an example computer system 440 which may represent or be integrated in any of the above-described components, etc. FIG. 4 is not intended to suggest any limitation as to the scope of use or functionality of embodiments of the application described herein. The computer system 440 is capable of being implemented and/or performing any of the functionality set forth hereinabove.

The computer system 440 may be described in the general context of computer system-executable instructions, such as program modules, being executed by a computer system. Generally, program modules may include routines, programs, objects, components, logic, data structures, and so on that perform particular tasks or implement particular abstract data types. The computer system 440 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 440 is shown in the form of a general-purpose computing device. The components of the computer system 440 may include, but are not limited to, one or more processors (such as CPUs 442 and GPUs 444), a communication interface 446, one or more input/output interfaces 448 and one or more storage devices 450. Although not shown, the computer system 440 may also include a system bus that couples various system components including system memory to the CPUs 442. In some embodiments, the input/output interfaces 448 may also include a network interface. For example, in some embodiments, some or all of the components of the control system 400 may be in communication via a controller area network ("CAN") bus or the like.

The storage device 450 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 450 can read and write to a non-removable, non-volatile magnetic media (not shown and typically called a "hard drive"). Although not shown, the storage device 450 may include one or more removable non-volatile disk drives such as magnetic, tape or optical disk drives. In such instances, each can be connected to the bus by one or more data media interfaces. Storage device 450 may include at least one program product having a set (e.g., at least one) of program modules that are configured to carry out the functions of various embodiments of the application.

FIGS. 5A-5C are diagrams illustrating exterior views of a semi-truck 500 that may be used in accordance with example embodiments. Referring to FIGS. 5A-5C, the semi-truck 500 is shown for illustrative purposes only—those skilled in the art, upon reading the present disclosure, will appreciate that embodiments may be used in conjunction with a number of different types of vehicles. The example semi-truck 500 shown in FIGS. 5A-5C is one configured in a common North American style which has an engine 506 forward of a cab 502, a steering axle 514 and two drive axles 516. A trailer (not shown) is attached to the semi-truck 500 via a fifth-wheel trailer coupling that is provided on a frame 518 positioned over the drive axles 516. A sleeper compartment 512 is positioned behind the cab 502. A number of sensors are positioned on different locations of the semi-truck 500. For example, sensors may be mounted on a roof of the cab 502 on a sensor rack 520. Sensors may also be mounted on side mirrors 510 as well as other locations. As will be discussed, sensors may be mounted on the bumper 504 as well as on the side of the cab 502 or other locations. For example, a rear facing radar 536 is shown as mounted on a side of the cab 502 in FIG. 5A. Pursuant to some embodiments, a rear facing lidar 540 is also provided which is operated to detect an orientation of a trailer as described herein. Embodiments may be used with other configurations of trucks or other vehicles (e.g., such as semi-trucks having a cab over or cab forward configuration or the like). For example, embodiments may be used in conjunction with other types of vehicles that tow a trailer to allow improved information about trailer orientation. In general, and without limiting embodiments of the present invention, features of the present invention may be used with desirable results in vehicles that carry cargo over long distances, such as long-haul semi-truck routes.

FIG. 5B is a front view of the semi-truck 500 and illustrates a number of sensors and sensor locations. The sensor rack 520 may secure and position several sensors including a long range lidar 522, long range cameras 524, GPS antennas 534, and mid-range front facing cameras 526. The side mirrors 510 may provide mounting locations for rear-facing cameras 528 and mid-range lidar 530. A front radar 532 may be mounted on the bumper 504. It will be appreciated to one of skill in the art that sensors may be mounted or installed on other locations and the types of sensors at various locations are not limited to the exemplary embodiments therein as the locations, sensor types and mounts depicted in FIGS. 5A-5C are for illustrative purposes only. Referring now to FIG. 5C, a partial view of the semi-truck 500 is shown which shows an interior of the cab 502 and the sleeper compartment 512. In some embodiments, portions of the control system 400 of FIG. 4 are deployed in a systems rack 540 in the sleeper compartment 512, allowing easy access to components of the control system 400 for maintenance and operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system, comprising:
   a memory configured to store sensor data associated with an orientation of a trailer that is captured by at least a first sensor of a vehicle; and
   a processor configured to:
   identify, using the sensor data, a current plane occupied by a front face of the trailer;
   identify, using the sensor data, a reference plane associated with the front face of the trailer in a reference orientation;
   compare the current plane with the reference plane to identify an angle of articulation between the trailer and the vehicle;
   generate a control signal based on the angle of articulation; and
   provide the control signal to a control system of the vehicle to control operation of the vehicle.

2. The computing system of claim 1, wherein the processor is further configured to determine, using the angle of articulation and information identifying a dimension of the trailer, a position of a rear of the trailer.

3. The computing system of claim 1, wherein the processor is further configured to determine, using the angle of articulation and information identifying a trajectory of the vehicle, a projected trajectory of the trailer.

4. The computing system of claim 1, wherein the at least first sensor includes a lidar sensor and the lidar sensor is one of a two dimensional lidar sensor and a three dimensional lidar sensor.

5. The computing system of claim 1, wherein the processor is further configured to determine, using the angle of articulation and information identifying a trajectory of the vehicle and information from at least a second sensor of the vehicle, a projected trajectory of the trailer.

6. The computing system of claim 4, wherein the first sensor is mounted on a rear of the vehicle directed at the front face of the trailer.

7. The computing system of claim 1, wherein the processor is further configured to filter the sensor data prior to identifying the angle of articulation.

8. The computing system of claim 1, wherein the processor is further configured to:
   generate a representation of a position of the vehicle and the trailer; and display the representation on a display device.

9. The computing system of claim 1, wherein the control signal includes an alarm.

10. The computing system of claim 1, wherein the control signal causes an adjustment to at least one of: (i) a throttle, (ii) a steering control system, and (iii) a braking system.

11. A method performed by a computer, comprising:
    receiving sensor data associated with an orientation of a trailer that is captured by at least a first sensor of a vehicle;
    identifying, using the sensor data, a current plane occupied by a front face of the trailer;
    identifying, using the sensor data, a reference plane associated with the front face of the trailer in a reference orientation;
    comparing the current plane with the reference plane to identify an angle of articulation between the trailer and the vehicle;
    generating a control signal based on the angle of articulation; and
    providing the control signal to a control system of the vehicle to control operation of the vehicle.

12. The method of claim 11, wherein the at least first sensor is a lidar sensor mounted on a rear of the vehicle and directed at the front face of the trailer.

13. The method of claim 11, further comprising determining, using the angle of articulation and information identifying a dimension of the trailer, a position of the rear of the trailer.

14. The method of claim 11, further comprising determining, using the angle of articulation and information identifying a trajectory of the vehicle, a projected trajectory of the trailer.

15. The method of claim 11, further comprising:
    generating a representation of a position of the vehicle and the trailer; and
    displaying the representation on a display device.

16. The method of claim 11, wherein the control signal is an alarm.

17. The method of claim 11, wherein the control signal causes an adjustment to at least one of: (i) a throttle, (ii) a steering control system, and (iii) a braking system.

18. A vehicle towing a trailer, comprising:
    at least a first lidar sensor mounted on a rear of the vehicle and directed at a front face of the trailer;
    a memory configured to store sensor data associated with a current orientation of the trailer that is captured by the one or more lidar sensors while the vehicle is in operation as well as a reference orientation of the trailer that is captured by the one or more lidar sensors while the vehicle and the trailer are in a known configuration; and
    a processor configured to:
    identify, using the sensor data, a current plane occupied by a front face of the trailer;

identify, using the sensor data, a reference plane associated with the front face of the trailer in a reference orientation;

generate an angle of articulation based on a comparison of the current plane of the trailer with the reference plane of the trailer; and generate a control signal based on the angle of articulation.

19. The vehicle towing a trailer of claim 18, wherein the control signal is further generated based on information from at least a second sensor mounted on the vehicle.

20. The vehicle towing a trailer of claim 19, wherein the at least second sensor senses information associated with an environment in which the vehicle is operating.

* * * * *